Jan. 20, 1970 H. PETROHILOS 3,491,252

AC-DC CONVERTER

Filed Nov. 16, 1964 2 Sheets-Sheet 1

INVENTOR
HARRY PETROHILOS

BY [signature]

HIS ATTORNEY

AC-DC CONVERTER

Filed Nov. 16, 1964 2 Sheets-Sheet 2

INVENTOR
HARRY PETROHILOS

BY Milton E. Gilbert

HIS ATTORNEY

United States Patent Office 3,491,252
Patented Jan. 20, 1970

3,491,252

AC-DC CONVERTER

Harry Petrohilos, Yellow Springs, Ohio, assignor to United Systems Corporation, Dayton, Ohio, a corporation of Ohio Filed Nov. 16, 1964, Ser. No. 411,231
Int. Cl. G06g 7/12
U.S. Cl. 307—229 18 Claims

ABSTRACT OF THE DISCLOSURE

An AC to DC converter in which AC voltage is attenuated to a desired level in an attenuator and applied to a high gain current amplifier through a resistor. A feedback resistor introduces negative current feedback to the amplifier proportional to the amplifier output voltage and a current feedback factor reduces the overall voltage gain to unity. AC to DC conversion takes place within the feedback loop so that both amplifier gain and rectifying element characteristics have negligible effect on the AC to DC conversion gain. Amplifier output is fed to an averaging filter which produces a low ripple DC output, precisely proportional to the average value of the input voltage.

This invention relates to an AC to DC converter, and is more particularly concerned with accurately converting an unknown AC voltage to an equivalent DC voltage for measurement by DC instruments.

It is therefore one object of the invention to provide an AC to DC converter which responds faithfully to the average value of the input waveform. Another object of the invention is to provide an AC to DC converter of simple and economical construction which nevertheless accurately converts an unknown AC voltage to an equivalent DC voltage for measurement by DC instruments. A further object of the invention is to provide an AC to DC converter in which a current amplifier is employed together with a feedback loop to provide the AC to DC conversion.

Figure 1:
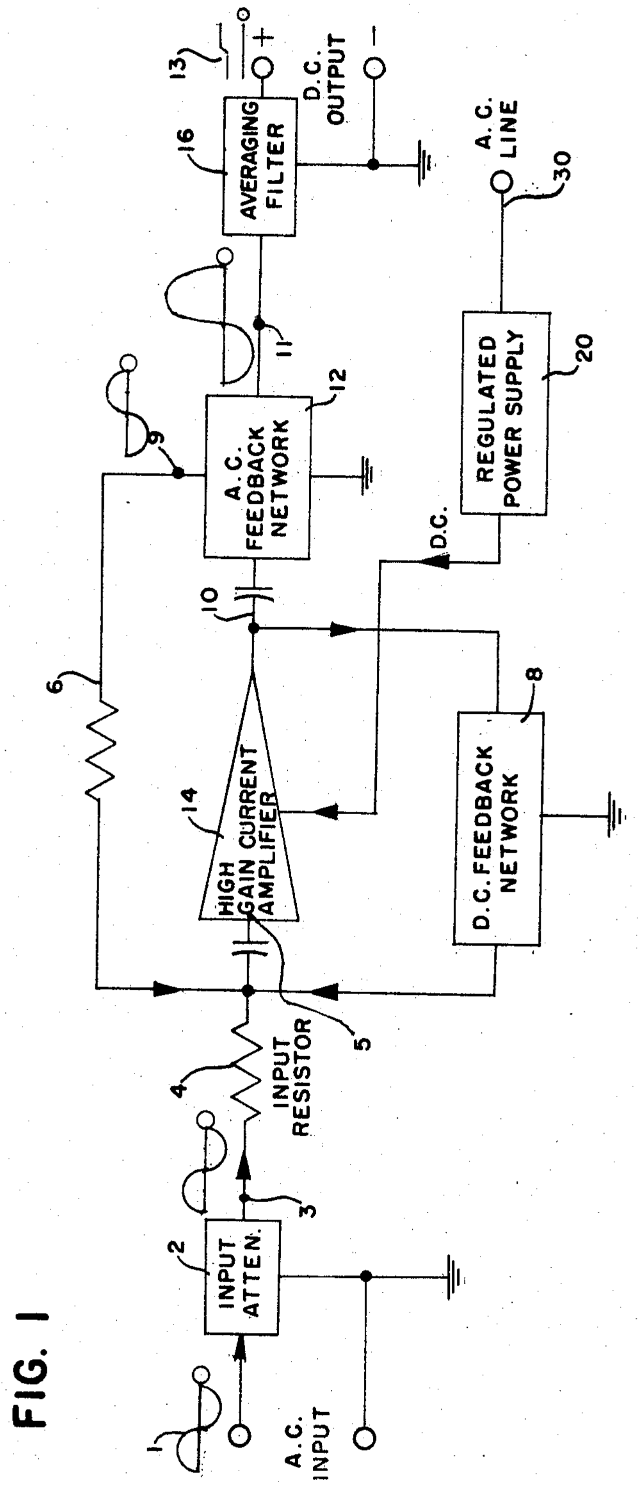
Figure 2:
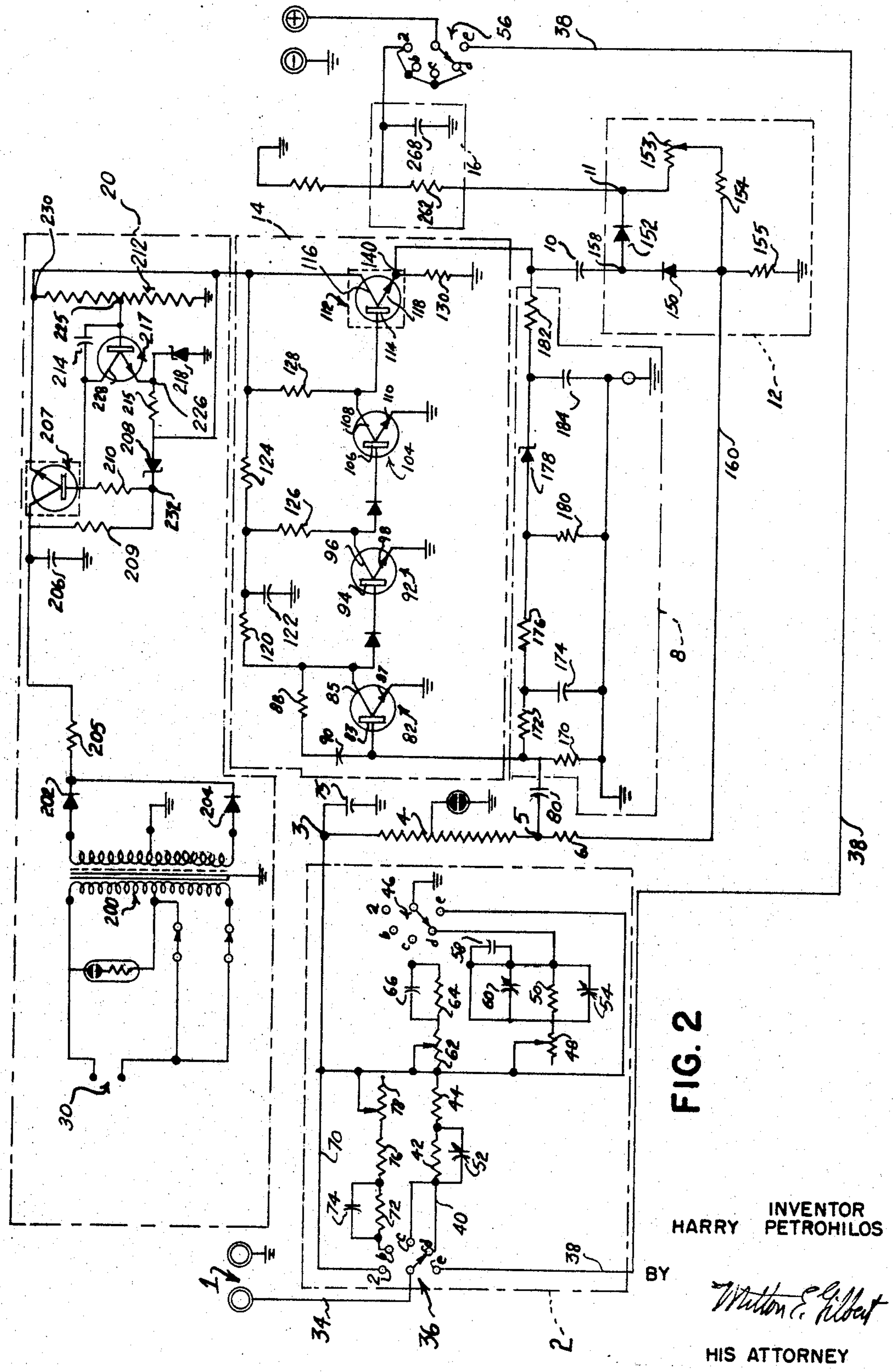

These and further objects of the invention will become more readily apparent upon a reading of the description following hereinafter and an examination of the drawings, in which:

FIGURE 1 is a block diagram illustrating the basic components of the AC to DC converter of the invention; and FIGURE 2 is a schematic wiring diagram of the AC to DC converter of the invention.

The converter of the invention consists of a frequency compensated input attenuator, a high gain transistorized current amplifier, AC and DC feedback networks, an averaging filter, and a regulated power supply. The AC voltage under measurement is attenuated to a suitable level by the input attenuator, and is applied as the input to the amplifier through an input resistor. A feedback resistor introduces negative current feedback to the amplifier proportional to the amplifier output voltage. A current feedback factor reduces the overall voltage gain to unity. The AC to DC conversion takes place within the feedback loop so that both amplifier gain and rectifying element characteristics have negligible effect on the AC to DC conversion gain. In the output waveform of the amplifier the positive and negative amplitudes differ by a ratio that is determined by a calibration network in the feedback path. The amplifier output is fed to an averaging filter which produces a low ripple DC output, precisely proportional to the average value of the input voltage.

With further reference to FIGURE 1 it is seen that the unknown AC signal input appears at 1 and is of the waveform shown. This signal is then attenuated in the input attenuator 2, which permits the accommodation of a wide range of voltages under measurement. After attenuation, i.e. after the input signal is divided into a known ratio, the signal is passed through the input resistor 4. The waveform of the input signal after passing through the attenuator 2 is shown at point 3 just prior to passing through the resistor 4. Point 5 can be termed as a summing point since both input current and feedback current are summed at point 5.

A current amplifier 14 is employed since the overall voltage grain required in the converter for use with a DC measuring instrument has been found to be very small. In an ideal current amplifier a zero input voltage is employed and only the input current varies. However, since in this device of the invention it is desired to measure voltage, an input resistor 4 is employed in which a current is developed that is proportional to the input voltage at the output point 3 of the attenuator. The AC feedback through resistor 6 is a negative feedback so that any tendency for point 5 to rise in voltage is cancelled by the negative feedback coming from the AC feedback network 12.

The output of the amplifier 14 is fed through a capacitor 10 which serves to isolate any DC level that may be present.

The AC feedback resistor 6 determines the overall closed loop gain of the amplifier, and the resultant gain stability is dependent almost exclusively on the values of the resistances 4 and 6, and if these resistors are made equal as in the preferred embodiment of the invention, then the voltage gain of the amplifier is unity. The waveform at the output of the AC feedback is indicated at 9.

A DC feedback network 8 is also provided which interconnects the output of the amplifier 14 with the summing point 5. Since the amplifier 14 is a relatively high gain current amplifier, it extracts a negligible input current from the summing junction 5. Therefore, the input current between junctions 3 and 5, and the feedback current through resistor 6 are very nearly equal.

The AC feedback network 12 contains several diodes which are placed in the path of the AC signal output of the amplifier 14. One of these diodes is employed to derive a positive unidirectional voltage which is then passed through an averaging filter 16 which is an RC network. The waveform input to the filter is indicated at 11, and the waveform output from the filter is indicated at 13. The filter 16 converts the voltage of the amplifier output into a voltage which is proportional to the average value of the original AC signal at 1.

The purpose of the DC feedback network 8 is to standardize the biases in the current amplifier so that it will operate safely over a wide temperature range and accommodate various tolerances in the components of the amplifier. The D.C. feedback network 8 contains a filter which removes all AC components so that all of the AC feedback is required to pass through the AC feedback network 12. Additionally the DC feedback network 8 serves to standardize the output voltage of the amplifier so that a large input signal can be accommodated and so that the operating point in the last stage of the amplifier will be held substantially constant regardless of any ambient temperature changes.

A regulated power supply 20 is provided, which receives an input from the AC line at 30 and serves to power the amplifier. This power supply also reduces unstable ratings in the output by providing stable DC operating voltages for the amplifier.

With reference now to the wiring diagram of FIGURE 2 it is seen that the AC input at 1 to the device of the invention is conducted over the line 34 to the input attenuator 2. In the embodiment shown the input of the attenuator has four ranges, and for each of these four ranges the output has only one value, i.e. it is divided into a convenient output range of AC. A switch selector 36 is employed to select the range of the unknown AC input signal. Five such ranges are shown and indicated by the designations "*a*," "*b*," "*c*," "*d*," and "*e*." As indicated hereinafter, it is generally desirable to commence operation with the switch in the "*d*" position, since this is the highest range and then work down to position "*a*." The position "*e*" is employed to bypass the AC to DC converter in the event DC voltages are to be measured, without having to disconnect the converter. In the "*e*" position the input signal is conducted over line 38 to the "*e*" terminal at the output deck 56 of the switch 36. The switch 36 has an intermediate deck 46 with similar positions "*a*," "*b*," "*c*," "*d*" and "*e*." Thus when the switch is positioned at "*e*" all three decks 36, 46 and 56 are so connected that the amplifier 14 is bypassed. FIGURE 2 illustrates the connections with the switch at position "*d*," the highest range.

For illustration purposes the range "*d*" will permit measurement of voltages of 0–1000 volts, whereas range "*c*" permits measurement of voltages from 0–100 volts, range "*b*" permits measurement of voltages from 0–10 volts, and range "*a*" permits measurement of voltages from 0–1 volt. It is realized of course that any convenient voltage ranges could be selected, and those indicated above are considered to be the ranges most usually encountered. With the switch in "*d*" position the input unknown voltage will be conducted over line 40 to a resistance divider made up of resistors 42, 44, 48 and 50. Resistor 48 is used to calibrate the instrument and would customarily be set at the factory, and with the ranges indicated above, would be adjusted to calibrate the attenuator to the proper values so that 1000 volts input will produce 1 volt output. Capacitors 52, 54, 58 and 60 are employed to compensate the attenuator at high frequencies in conjunction with the resistances. The fixed capacitor is so selected as to provide the approximate value required, and capacitors 54 and 60 are employed to trim that value to the exact value required for high frequency attenuation.

In range position "*c*" current again flows through resistors 42 and 44, but instead of the "*d*" path, the resistors 62 and 64 are now connected through deck 46. Capacitor 66 provides high frequency compensation for this range.

In range position "*b*" a series of resistances 72, 76 and 78 are interposed, with the capacitor 74 being employed for high frequency compensation. No resistance is applied between point 3 and ground, an line 70 is used to conduct the signal to point 3.

In the range position "*a*" the attenuator is disconnected or bypassed, and the signal is conducted directly over line 70 to the input point 3 of the amplifier.

The input voltage is then applied at point 3 through resistor 4 to summing junction 5. Point 3 is connected to ground through a capacitor 75 which standardizes the input capacitance to the amplifier. This is necessary since due to wiring variances the capacitance at point 3 may vary, and by putting a fixed capacitor of relatively high value at this point the device is made compatible, especially at high frequency compensation adjustment of the attenuator. Capacitor 80 permits AC current to flow to summing junction 5, without any DC flowing back through the DC feedback network to the attenuator.

Amplifier 14 is a four-stage current amplifier, the first three stages of which are in common emitter connection, with the collector of each preceding stage being coupled to the base of the next succeeding stage by means of a diode. I have found it desirable to so connect the stages through the diode so that the collector of the preceding stage will be at a higher potential than the base of the next stage, thus permitting the collector of the previous stage to be considerably above the saturation point so that the transistors operate a little above saturation. Operation a little above saturation is possible in the device of the invention since a large voltage swing is not needed in a current amplifier and additionally, diodes have a very low AC impedance so that it is not necessary to employ electrolytic capacitors to couple the signal. Thus a desirable voltage drop is provided for the DC bias, while at the same time the AC signal is passed through the amplifier with negligible resistance. The output of the third stage is coupled directly to the base of the fourth stage which is connected in the common collector configuration. The emitter of the fourth stage is the output of the amplifier.

As indicated in FIGURE 2 the AC signal appearing at point 5 is applied ot the base 83 of the transistor 82 and the amplified signal appearing at collector 85 is coupled through diode 100 to the base 94 of transistor 92. In like manner the signal is amplified by transistor 92 and appears at collector 96 which is coupled via diode 102 to the base 106 of transistor 104. The amplified signal from transistor 104 is directly passed from collector 108 to the base 114 of the fourth stage transistor 112, with the output appearing at the emitter 118 and point 140.

In operation, as the voltage at point 140 tends to rise, this increases the current to point 5, and as the DC current to point 5 tends to increase, the transistor 82 tends to draw more collector current, which lowers the potential at the collector 85, and therefore decreases the current to the base 94 of the transistor 92. As the current to the base 94 is decreased, the current to the base 106 of transistor 104 tends to increase because of current flow through resistor 126, thereby tending to decrease the voltage on the collector of the transistor 104. Since the transistor 104 is connected to the base 114 of the transistor 112, it tends to drop in voltage, i.e. a voltage drop at base 114. This in turn causes the emitter 118 of transistor 112 to drop in voltage and reestablish the original voltage value at point 140. Thus, the amplifier is caused to exhibit D.C. voltage stabilization. The function of D.C. voltage stabilization is accomplished by the D.C. feedback network 8, which causes regulation without feeding back any AC component. Thus, at point 140 there appears an AC signal of considerable magnitude. The DC gain of the amplifier therefore is used to stabilize the output point 140 by means of the D.C. feedback network.

Considering the amplifier in further detail, and with reference to FIGURE 2, it is seen that resistor 124 is a decoupling resistor which removes all small noise or oscillations that may be coming from the power supply 20 to the first two stages of the amplifier, i.e. it reduces the response of these first two stages to these transients. Resistor 120 is the load resistor for the first transistor 82, and resistor 126 is the load resistance for the second transistor 92. Resistor 128 is the collector load for transistor 104. Resistor 88 and capacitor 90 form an RC negative feedback loop around the first stage 82 of the amplifier, which reduces high frequency oscillations. Resistor 130 is the emitter resistance for the emitter follower 118.

As indicated above, the AC signal is applied to the base 83 of transistor 82, through capacitor 80; and is successively amplified by the stages 82, 92 and 104. Transistors 82 and 92 provide an overall current gain which is approximately proportional to the product of the current gain of the two transistors. Transistor 104 provides further current gain, and a relatively large voltage is developed across resistor 128 which is approximately proportional to the product of the current gains of the three transistors 82, 92 and 104, times the value of resistor 128. Transistor 112 has a voltage gain of slightly less than 1 and produces a current flow through resistor 130 and at point 140. This output current flows through the AC feedback network and has two components; a small component flows through resistance 130, and the major component of the AC load current flows through the AC feedback network.

The AC feedback network 12 is indicated in FIGURE 2; the AC signal from point 140 being applied to point 158 through the capacitor 10. The positive portion of the AC signal is conducted through diode 152 and through resistances 153, 154 and 155, to ground. A portion of this positive signal is fed back over line 160 to the input of the amplifier, through resistance 6 and summing junction 5. The negative portion of the AC signal is directly fed back through line 160 through diode 150 without any attenuation through resistance 6 to the summing junction 5. As indicated in FIGURE 1, the positive part of the signal at point 11 (i.e. the output point of the AC feedback network) has a larger amplitude than the negative signal at point 9 (i.e. the output from the AC feedback network to line 160). Therefore, the waveform at point 11 possesses a net DC value that is the average of the difference between the negative and positive values of the signal. Resistance 153 is a variable trimmer which causes the positive part of the waveform to be variable to an arbitrary calibration point. The waveform at point 11 is applied to an averaging filter 16 consisting of the RC network 262 and 268, and is thereby converted to a DC signal output whose value is equal or proportional to the average value of the difference between the positive and negative components of the AC waveform at point 11.

As indicated above, the purpose of the AC feedback network 12 is to pass the feedback current through the rectifying diode 150 so that diode characteristics will not affect the conversion gain, i.e. the AC to DC ratio will not change with diode characteristics or with any influence of temperature on the diode. The purpose of the DC feedback network 8, on the other hand, is to insure that the output of the amplifier at point 140 will be operative at about ½ the value of the power supply in order to accommodate the largest possible signal, i.e. operating point DC stability. If the DC voltage at the output point 140 tends to rise, a larger current wants to flow through the DC feedback network back to the input of the amplifier, and this would automatically cause the output point 140 to reestablish itself substantially at its original value. Another purpose of the DC feedback network is to filter out all the AC components fed back so that the amplifier may be used as a high gain AC amplifier. Considered as a DC amplifier it has a very low gain, because it has very heavy negative feedback. With reference to FIGURE 2, the resistor 182 and capacitor 184 constitute a low pass filter, which as a first approximation removes practically all the AC component from the signal which appears at point 140. Zener diode 178 is used to reduce the DC feedback resistance since it is well known that a Zener diode has a fixed voltage across it and any voltage change at one terminal will be transmitted to the other terminal. This causes a much higher DC feedback to be applied to the input of the amplifier, therefore effectively increasing the DC feedback factor. If the Zener 178 were replaced by an ordinary resistor, there would still be DC feedback but of a much lower value than what is obtained with a Zener diode, assuming the same voltage drop. Resistor 180 is used to conduct enough current initially so that the Zener diode will be biased to its proper operating point. Resistance 176 and capacitor 174 are an additional low pass filter which will remove any remaining trace of AC voltage that may have passed the first filter 182–184. Resistors 172 and 170 determine the bias of the base 83 of the first stage transistor 82 of the amplifier. Additionally, the ratio of resistors 172 and 170 and their combined value determines the output voltage to the amplifier, i.e. provides the DC stability for the AC amplifier.

In order to prevent any changes in line voltage from affecting the output of the instrument, which is normally fed into an instrument of very high resolution, a regulated power supply 20 is provided. Thus, where a digital voltmeter is to be used in conjunction with the device of the invention, it is apparent that any small disturbances in line voltage which would not be seen on a moving coil voltmeter, will be seen very clearly in a digital meter readout. This would further cause much instability in the meter in the last digit readout. It is also apparent that anything appearing at the output of the device of the invention should only represent the unknown input signal and not any fluctuations in power supply. Furthermore, although the DC feedback network serves to correct for any slow variations in the output of the power supply that may be due to temperature instability; any transient appearing from the line that is too fast for the amplifier to correct will appear as a spurious signal at the output which will be indistinguishable from unknown signal input. The regulated power supply corrects all these possible shortcomings. Power input for the power supply 20 is taken from line 30 and applied to power transformer 200. The output of the secondary of transformer 200 is connected to the full wave rectifier consisting of diodes 202, 204, limiting resistor 205 and filtering capacitor 206. Transistor 207 is a series regulator and transistor 217 is an amplifier. The transistor 217 compares the output of the divider consisting of resistors 209, 205 and 210 with the voltage of the slider of the potentiometer 212, and with the voltage across Zener diode 218.

If the voltage at point 225 (i.e. at the slider of the potentiometer 212), tends to become more positive than the voltage at point 226, (i.e. the emitter of transistor 217), the transistor 217 will turn on and start to conduct. This drops the voltage at the collector 228, which in turn lowers the voltage at point 230, which is the output of the power supply. If the voltage at point 225 tends to fall below the voltage at point 226, then the transistor 217 tends to cut off, which raises the voltage at the output point 230. Thus, point 225 is maintained at constant voltage, regardless of any tendency to change voltage at this point since an immediate correction is applied by this circuit. Consequently the output of the power supply is maintained constant regardless of any line voltage transients or changes in load. The stability of the power supply is further improved by supplying the Zener diode 218 with a constant current since the dropping resistor 215 for that diode has a fixed voltage drop across it. Therefore the voltage at the Zener diode 218 will not vary either. Another Zener diode 208 is provided to furnish a constant voltage for biasing the transistor 207, i.e. point 232 remains at a constant voltage. This enables a large voltage drop to be developed across the transistor 207, and therefore causes transistor 217 to have a much higher gain than it would normally have, without the necessity of connecting the transistor 207 to an unregulated supply. This also tends to make the voltage regulator more stable. The function of capacitor 214 is to insure that the transistor 217 will not oscillate at high frequencies, such as might occur at some high frequency where the gain would be high enough and the phase shift of such magnitude as to cause the power supply to experience oscillations. This frequency of course is much higher than the normal changes experienced due to line transients. Therefore the capacitor 214 produces negative feedback to drop the gain of the first transistor 207 to a very small value at high frequencies so that the oscillations do not take place, and the effective gain of the amplifier transistor 217 at this oscillatory frequency is very low.

Although I have described the AC-DC converter of my invention with particularity and with reference to a specific schematic, it is obvious to those skilled in the art that various modifications, rearrangement of parts, and substitution of components can be accomplished without departing from the spirit and scope of the invention.

What I claim is:

1. An AC-DC converter for converting an unknown AC voltage to an equivalent DC voltage comprising, in combination:

a frequency compensated attenuator for receiving the unknown AC voltage and dividing it by a pre-determined ratio;

a high gain transistorized AC amplifier for receiving the output of said attenuator and producing an AC output in which the positive and negative amplitudes differ by an amount proportional to the amplitude of the unknown AC signal, means for introducing negative current, feedback into into the amplifier proportional to the amplifier output voltage, and filter means for converting the amplifier output signal into a low ripple DC output proportional to the value of the unknown AC voltage.

2. The converter of claim 1 wherein the feedback means includes an AC feedback resistor.

3. The converter of claim 1 wherein the feedback means includes an AC feedback resistor, and the output of the attenuator is passed through an input resistor prior to the amplifier, in which a current is developed which is proportional to the voltage of the output signal of the attenuator.

4. The converter of claim 3 in which the AC feedback resistor and the input resistor substantially serve to determine the voltage gain and the input impedance of the amplifier.

5. An AC-DC converter for converting an unknown AC voltage to an equivalent DC voltage comprising, in combination:

a frequency compensated attenuator for receiving the unknown AC voltage and dividing it by a pre-determined ratio;

a high gain transistorized AC amplifier for receiving the output of said attenuator and producing an AC output signal in which the positive and negative amplitudes differ by an amount proportional to the amplitude of the unknown signal, said amplifier having multi-transistor stages in which all stages prior to the final stage are in common emitter connection, with the collector of each preceding stage being coupled to the base of the next succeeding stage by a diode, whereby the said common emitter connected stages are caused to operate above saturation.

means for introducing negative current feedback into the amplifier proportional to the amplifier output voltage, and filter means for converting the amplifier output signal into a low ripple DC output proportional to the value of the unknown AC voltage.

6. The converter of claim 5 wherein the final transistor stage of the amplifier has its base directly coupled to the collector of the preceding stage and has its collector connected to a power supply which is common to the preceding stages, the emitter of the said final stage constituting the output of the said amplifier.

7. A high gain transistorized AC amplifier for receiving an unknown AC signal and producing an AC output signal in which the positive and negative amplitudes differ by an amount proportional to the amplitude of the unknown AC signal, said amplifier having multi-transistor stages in which all stages prior to the final stage are in common emitter connection, with the collector of each preceding stage being coupled to the base of the next succeeding stage by a diode, whereby the said common emitter connected stages are caused to operate above saturation.

8. The amplifier of claim 7 wherein the final transistor stage of the amplifier has its base directly coupled to the collector of the preceding stage and has its collector connected to a power supply which is common to the preceding stages, the emitter of the said final stage constituting the output of the said amplifier.

9. An AC-DC converter for converting an unknown AC voltage to an equivalent DC voltage comprising, in combination:

a high gain transistorized AC amplifier for receiving an unknown AC signal and producing an AC output signal in which the positive and negative amplitudes differ by an amount proportional to the amplitude of the unknown AC signal, an AC feedback network for receiving the AC signal output of said amplifier including means for conducting a portion of the positive cycle of said output signal to the input of said amplifier, and means for passing the negative cycle of said output signal to the input of said amplifier, whereby the AC-DC ratio of said amplifier will be unaffected by ambient temperature differences, and filter means for converting the amplifier output signal a low ripple DC output proportional to the value of the unknown AC voltage.

10. An AC-DC converter for converting an unknown AC voltage to an equivalent DC voltage comprising, in combination:

a high gain transistorized AC amplifier for receiving an unknown AC signal and producing an AC output signal in which the positive and negative amplitudes differ by an amount proportional to the amplitude of the unknown AC signal, said amplifier having multi-transistor stages in which all stages prior to the final stage are in common emitter connection, with the collector of each preceding stage being coupled to the base of the next succeeding stage by a diode, whereby the said common emitter connected stages are cause to operate above saturation.

an AC feedback network for receiving the AC signal output of said amplifier including means for conducting a portion of the positive cycle of said signal to the input of said amplifier, and means for passing the negative cycle of said output signal to the input of said amplifier, whereby the AC-DC ratio of said amplifier will be unaffected by changes in the aforementioned means caused by ambient temperature variations, and filter means for converting the amplifier output signal into a low ripple DC output proportional to the value of the unknown AC voltage.

11. An AC-DC converter for converting an unknown AC voltage to an equivalent DC voltage comprising, in combination:

a high gain transistorized AC amplifier for receiving an unknown AC signal and producing an AC output signal in which the positive and negative amplitudes differ by an amount proportional to the amplitude of the unknown AC signal, a DC feedback network for receiving the output of said amplifier including a filter means for removing substantially all AC components from the signal fed back by such network to the input of said amplifier thus insuring a substantially pure DC feedback signal, and means for increasing the DC feedback factor, whereby should the DC voltage appearing at the output of the amplifier tend to rise, the DC feedback signal will increase thus causing the amplifier output signal to return to its original DC voltage level, and filter means for converting the amplifier output signal into a low ripple DC output proportional to the value of the unknown AC voltage.

12. The converter of claim 11 in which the means for increasing the DC feedback factor comprises a Zener diode connected in series with the filter means to reduce the DC feedback resistance.

13. The converter of claim 11 including a frequency compensated attenuator for receiving the unknown AC voltage and dividing it by a pre-determined ratio, and feeding such attenuated signal to the input of the said AC amplifier.

14. The converter of claim 11 including an AC feedback network for receiving the AC signal output of said amplifier including means for conducting a portion of the positive cycle of said output signal to the input of said amplifier, and means for passing the negative cycle of said output signal to the input of said amplifier, whereby the AC-DC ratio of said amplifier will be unaffected by ambient temperature differences.

15. A high gain transistorized AC amplifier for receiving an unknown AC signal and producing an AC output signal in which the positive and negative amplitudes differ by an amount proportional to the amplitude of the unknown AC signal, said amplifier having multi-transistor stages in which all stages prior to the final stage are in common emitter connection, with the collector of each preceding stage being coupled to the base of the next succeeding stage by a diode, whereby the said common emitter connected stages are caused to operate above saturation, and a DC feedback network for receiving the output of said amplifier including a filter means for removing substantially all AC components from the signal fed back by such network to the input of said amplifier thus insuring a substantially pure DC feedback signal, and means for increasing the DC feedback factor, whereby should the DC voltage appearing at the output of the amplifier tend to rise, the DC feedback signal will increase thus causing the amplifier output signal to return to its original DC voltage level.

16. The amplifier of claim 14 in which the means for increasing the DC feedback factor comprises a Zener diode connected in series with the filter means to reduce the DC feedback resistance.

17. An AC-DC converter for converting an unknown AC voltage to an equivalent DC voltage comprising, in combination:

a frequency compensated attenuator for receiving the unknown AC voltage and dividing it by a predetermined ratio;

a high gain transistorized AC amplifier for receiving the output of said attenuator and producing an AC output in which the positive and negative amplitudes differ by an amount proportional to the amplitude of the unknown AC signal, means for introducing negative current feedback into the amplifier proportional to the amplifier output voltage, a regulated power supply for said converter comprising transformer means whose output is fed through a full wave rectifier, a voltage dividing and reference network, a series regulator means and a potentiometer including a slider; and a transistor amplifier element for comparing the output of the said reference network with the voltage at the slider of the potentiometer and producing a comparison signal, whereby when the comparison signal varies from a predetermined value the transistor amplifier element detects such variation and either turns on or off to raise or lower the comparison signal value to return same to the predetermined value, thereby stabilizing the output voltage of said power supply, and filter means for converting the amplifier output signal into a low ripple DC output proportional to the value of the unknown AC voltage.

18. The converter of claim 1 wherein the attenuator is a multi-range device including a plurality of voltage divider networks and capacitative shunt networks connected therewith for high frequency compensation over several ranges of input signals.

References Cited

UNITED STATES PATENTS

| | | | |
|---|---|---|---|
| 3,112,449 | 11/1963 | Miller | 328—26 |
| 3,196,291 | 7/1965 | Woodward | 328—26 |
| 3,264,569 | 8/1966 | Lefferts | 330—26 |
| 3,310,726 | 3/1967 | James | 328—26 |

JOHN S. HEYMAN, Primary Examiner

B. P. DAVIS, Assistant Examiner

U.S. Cl. X.R.

307—230; 321—8; 328—26